E. L. VIARD AND F. A. BOUILLIT.
ELASTIC SUSPENSION OF CYCLES.
APPLICATION FILED SEPT. 4, 1919.
1,335,765.
Patented Apr. 6, 1920.
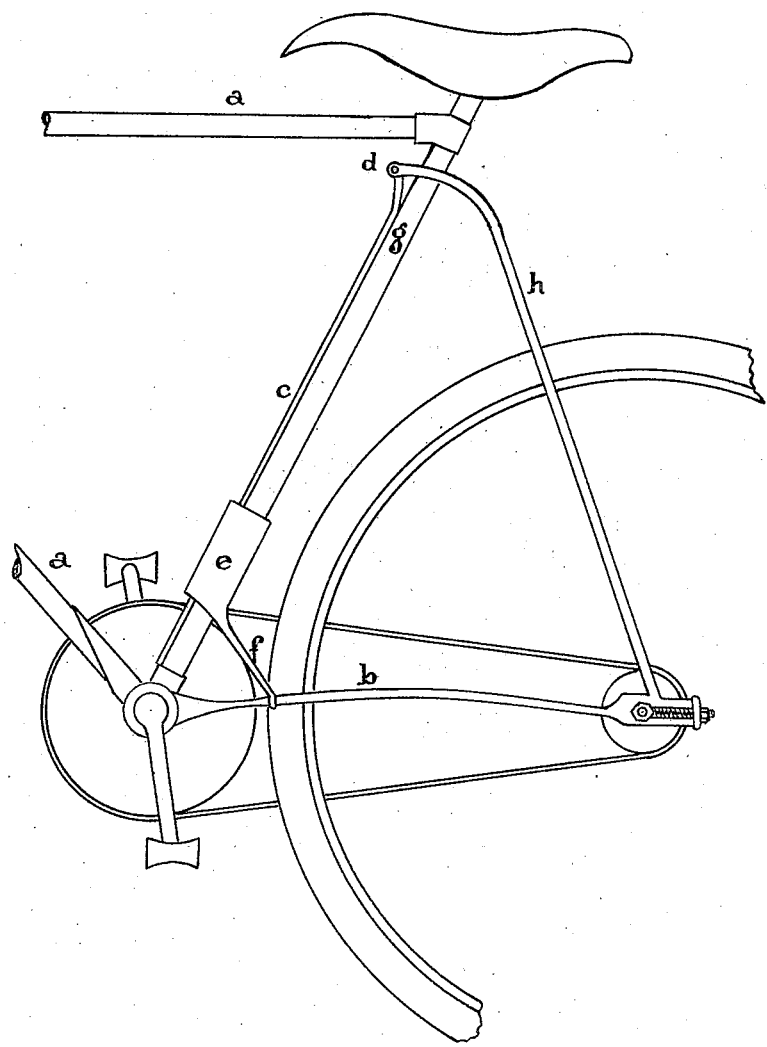

UNITED STATES PATENT OFFICE.

EUGÈNE LOUIS VIARD, OF BAR-SUR-SEINE, AND FIRMIN ALBERT BOUILLIT, OF LEVALLOIS-PERRET, FRANCE.

ELASTIC SUSPENSION OF CYCLES.

1,335,765.   Specification of Letters Patent.   Patented Apr. 6, 1920.

Application filed September 4, 1919. Serial No. 321,705.

*To all whom it may concern:*

Be it known that we, EUGÈNE LOUIS VIARD, a citizen of the Republic of France, residing at Bar-sur-Seine, France, and FIRMIN ALBERT BOUILLIT, a citizen of the Republic of France, residing at Levallois-Perret, France, have invented new and useful Improvements in Elastic Suspension of Cycles, of which the following is a specification.

The invention has for its purpose to dampen in cycles and motor-cycles the shocks and jolts due to unevenness of the ground.

With the above and other objects in view, the invention consists in the construction, combination and arrangement of devices hereinafter described and claimed.

The accompanying drawing is an elevation of a portion of a bicycle provided with elastic suspension means constructed and arranged in accordance with my invention.

On the frame, the heretofore usual rigid fork connecting the crank-bearing with the rear-axle is superseded by two flat springs $b$ slightly curved. The shank of this fork is fixed on the crank-bearing and the ends of the branches are crossed by the rear-axle and bear the chain-stretcher.

Another spring-blade $c$ ended by an eye $d$ is provided against the saddle-bearing tube $g$, in front of or behind the said tube; in this latter case it is curved.

A sleeve $e$ provided with an oblique arm $f$ holds the blade $c$ against the tube $g$ and strengthens the elastic fork $b$.

Two rigid tubes $h$ have their lower ends connected to the rear end of the fork $b$ and their upper ends pivotally connected to the eye $d$.

Under the action of the weight of the cyclist the fork $b$ yields and the rigid tubes $h$ transmit the effort to the spring $c$. Consequently the cyclist rests on an elastic device.

We claim:

1. An elastic suspension for cycles, characterized by the combination of two rigid tubes, the lower ends of which bear upon an elastic fork at the level of the rear hub, with an elastic metal plate fixed against the saddle carrying tube, the elastic plate being held in position by a sleeve provided with an oblique arm which serves as a buttress or shoulder for the flexible fork.

2. In combination with a cycle frame including a saddle carrying tube, a spring fork attached to and extending rearwardly from the lower end of said tube, and in which the rear wheel is mounted, a spring blade on one side of said tube, rigid rods having their lower ends attached to the rear end of the spring fork and their upper ends pivotally connected to the upper end of the spring blade, and a sleeve securing the lower portion of the spring blade to the saddle carrying tube and having an arm which forms a buttress for the spring fork.

In testimony whereof we affix our signatures.

EUGÈNE LOUIS VIARD.
FIRMIN ALBERT BOUILLIT.